(12) United States Patent
Muthulankkat et al.

(10) Patent No.: US 12,688,084 B2
(45) Date of Patent: Jul. 21, 2026

(54) INTELLIGENT DATA FLOW CONTROL VALVE

(71) Applicant: Oracle International Corporation, Redwood Shores, CA (US)

(72) Inventors: Mahesh Muthulankkat, Trivandrum (IN); Prabakar Paulsami, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/901,606

(22) Filed: Sep. 30, 2024

(65) Prior Publication Data

US 2026/0093572 A1 Apr. 2, 2026

(51) Int. Cl.
| | |
|---|---|
| *G06F 11/00* | (2006.01) |
| *G06F 11/07* | (2006.01) |
| *G06F 11/30* | (2006.01) |
| *H04L 67/60* | (2022.01) |
| *H04L 69/321* | (2022.01) |

(52) U.S. Cl.
CPC ...... *G06F 11/0793* (2013.01); *G06F 11/0709* (2013.01); *G06F 11/30* (2013.01); *H04L 67/60* (2022.05); *H04L 69/321* (2013.01)

(58) Field of Classification Search
None
See application file for complete search history.

(56) References Cited

U.S. PATENT DOCUMENTS

| | | | |
|---|---|---|---|
| 2002/0161890 A1* | 10/2002 | Chen ................... | H04L 67/1095 709/226 |
| 2016/0316028 A1* | 10/2016 | Sengupta ................ | H04L 69/40 |
| 2024/0289203 A1* | 8/2024 | Hanson ............... | G06F 11/0751 |
| 2025/0021413 A1* | 1/2025 | Chemmancherry .... | G06F 9/547 |

FOREIGN PATENT DOCUMENTS

CN          118394485 A   *   7/2024   ........... G06F 9/5038

OTHER PUBLICATIONS

Yang et al., "An Improving Fault Detection Mechanism in Service-Oriented Applications Based on Queuing Theory," 2008 IEEE International Symposium on Service-Oriented System Engineering, Jhongli, Taiwan, 2008, pp. 245-250 (Year: 2008).*
Wikipedia, "Message-oriented middleware" (Year: 2025).*
Schmutz et al., "Fault Handling and Prevention—Part 1" (Year: 2012).*
Palma, "Dead Letter Queues: What They Are and When to Use Them," Medium (Year: 2023).*
Techtutor, "Dead-Letter Queue (DLQ)," TechTutorTips (Year: 2023).*

* cited by examiner

*Primary Examiner* — Bryce P Bonzo
*Assistant Examiner* — Gabriella Kanani Shelton
(74) *Attorney, Agent, or Firm* — Invoke

(57) ABSTRACT

A system for intelligent data flow control monitors an activity stream of an integration layer that processes events from an upstream system and transmits data to a downstream system. Upon detecting a recoverable error between the integration layer and the downstream system, the system instructs the upstream system to pause sending additional events. The system continues monitoring the activity stream to detect when the recoverable error is fixed. Once the error is resolved, the system instructs the upstream system to resume sending events to the integration layer. This (Continued)

approach prevents data loss during temporary system disruptions while maintaining efficient event processing flow.

20 Claims, 7 Drawing Sheets

Intelligent Data Flow Control Valve 104

Activity Stream Puller 112

Machine Learning Model 114

Learning Report 116

Database 118B

Upstream System 102

Event Sync 122

Event API 120

Event Queue 124

Integration Layer 106

Failed Events Queue 126

Downstream System 108

Database 118A

Monitor the event processing flow in the integration layer
302

Collect status codes along with the error messages
returned at integration layer
304

Construct machine learning model to determine
recoverable errors
306

Produce learning report using machine learning model
308

Update machine learning model and learning report
310

INTELLIGENT DATA FLOW CONTROL VALVE

TECHNICAL FIELD

The present disclosure relates to application integrations. In particular, the present disclosure relates to integration layers for software systems.

BACKGROUND

Organizations often use numerous applications to manage diverse aspects of their operations. Large enterprises often employ thousands of distinct applications, ranging from packaged software to on-premise solutions and software-as-a-service offerings. Cloud-based custom applications add further complexity to organizational technology landscapes. Managing these varied applications requires substantial administrative resources and expertise.

Application integration is a technical process of allowing different applications to work together. In general, an application integration obtains output from one application and, based on the output, supplies input to another application. The input may be the output itself, a transformed version of the output, and/or some other data obtained or generated based on the output. Application integration addresses challenges inherent in managing complex, multi-vendor software ecosystems. By centralizing integration management, organizations streamline administrative processes and reduce resource requirements. Integration layers enhance data integrity by minimizing manual intervention in cross-application data transfers. Automated data transformation capabilities ensure consistency across diverse application data models, fostering improved decision making through unified access to organizational information assets.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. INTELLIGENT DATA FLOW CONTROL VALVE ARCHITECTURE
3. HANDLING RECOVERABLE ERRORS IN AN INTEGRATION LAYER
4. TRAINING MACHINE LEARNING MODEL FOR HANDLING RECOVERABLE ERRORS IN AN INTEGRATION LAYER
5. EXAMPLE EMBODIMENT
6. PRACTICAL APPLICATIONS, ADVANTAGES & IMPROVEMENTS
7. MISCELLANEOUS; EXTENSIONS
8. HARDWARE OVERVIEW

1. General Overview

One or more embodiments monitor an activity stream of an integration layer to detect and manage recoverable errors. The integration layer receives events from an upstream system and transmits data to a downstream system in response to these events. Upon detecting a recoverable error between the integration layer and the downstream system, the system instructs the upstream system to pause sending additional events. This pause prevents data loss and allows for error resolution without overwhelming the integration layer with events that would likely fail processing.

One or more embodiments employ machine learning to enhance error detection and recovery processes. A machine learning model generates a learning report containing error detection parameters, such as HTTP status codes, error message patterns, and/or error frequency metrics. The system uses these parameters to identify recoverable errors. The learning report is user-reviewable, allowing for manual adjustments to error detection parameters based on domain expertise or specific system requirements.

One or more embodiments address a variety of recoverable error types, including planned outages, unplanned outages, password expirations, and permission issues. By categorizing and handling these diverse error scenarios, the system enhances the overall reliability and robustness of the integration process. The system's ability to adapt to different error types contributes to its effectiveness across various integration environments and use cases.

One or more embodiments described in this Specification and/or recited in the claims may not be included in this General Overview section.

2. Intelligent Data Flow Control Valve Architecture

Figure 1:
FIG. 1 illustrates a system for intelligent data flow control in accordance with one or more embodiments.

In accordance with an embodiment, FIG. 1 illustrates system 100 for intelligent data flow control in accordance with one or more embodiments. Upstream system 102 generates events for processing. Integration layer 106 receives events from upstream system 102 and processes the events according to defined business logic. Downstream system 108 interacts with integration layer 106 to receive processed data or execute further operations. Intelligent data flow control valve 104 monitors and helps manage data flow between system components.

In accordance with an embodiment, system 100 may include more or fewer components than the components illustrated in FIG. 1. The components illustrated in FIG. 1 may be local to or remote from each other. The components illustrated in FIG. 1 may be implemented in software and/or hardware. Components may be distributed over multiple applications and/or machines. Multiple components may be combined into one application and/or machine. Operations described with respect to one component may instead be performed by another component.

In accordance with an embodiment, upstream system 102 generates events for processing by the integration layer. Upstream system 102 encompasses various data sources and business applications that produce events requiring integration. Examples of upstream systems include customer relationship management (CRM) platforms generating customer interaction events, enterprise resource planning (ERP) systems producing inventory or order events, and Internet of Things (IoT) devices creating sensor data events. Upstream system 102 implements event generation logic to capture relevant business occurrences, data changes, or user actions.

In accordance with an embodiment, the upstream system 102 includes specialized components for event management. The event management infrastructure enables efficient generation, processing, and transmission of events to downstream systems. These components work together to ensure reliable event handling and provide flexibility for integrating with various external systems and data consumers.

In accordance with an embodiment, event API 120 exposes interfaces for generating and accessing event data within upstream system 102. Event API 120 provides a standardized set of methods and protocols for creating, modifying, and retrieving events. External systems and internal modules interact with event API 120 to trigger event creation based on business logic or data changes.

In accordance with an embodiment, an event sync module 122 coordinates the transmission of events from upstream system 102 to integration layer 106. Event sync module 122 manages the flow of events, implementing sophisticated algorithms for batching, prioritization, and delivery confirmation. By monitoring system conditions and integration layer capacity, event sync module 122 adjusts transmission rates to optimize throughput while preventing overload scenarios. Event sync module 122 also handles retries and implements circuit breaker patterns to maintain system stability during network issues or downstream failures.

In accordance with an embodiment, event queue 124 buffers events before transmission, allowing for flow control and ensuring system stability during high-volume periods or when downstream components experience issues. Event queue 124 implements a persistent storage mechanism to prevent data loss in case of system failures. Queue management algorithms for event queue 124 handle event prioritization, expiration policies, and resource allocation.

In accordance with an embodiment, integration layer 106 processes events received from upstream system 102 and orchestrates data flow to downstream system 108. Integration layer 106 encompasses a suite of components designed to handle complex integration scenarios across diverse enterprise applications and data sources. Examples of integration layer implementations include enterprise service buses (ESBs), integration platform as a service (iPaaS) solutions, and API management platforms. Integration layer 106 applies transformation logic to convert events between different data formats, such as translating XML messages to JSON payloads or mapping proprietary data structures to standardized schemas. Business rules engines within integration layer 106 execute conditional logic and routing decisions based on event content and metadata. Integration layer 106 implements protocol mediation, enabling communication between systems using disparate protocols, such as simple object access protocol (SOAP), representational state transfer (REST), Java message (JMS), or message queuing telemetry transport (MQTT).

In accordance with an embodiment, integration layer 106 incorporates failed events queue 126. Failed events queue 126 stores events that encounter processing errors, enabling retry attempts and preventing data loss during temporary system disruptions or recoverable error scenarios.

In accordance with an embodiment, intelligent data flow control valve 104 monitors an activity stream of an integration layer that processes events from an upstream system and transmits data to a downstream system. Intelligent data flow control valve 104 detects recoverable errors between integration layer 106 and downstream system 108 while monitoring the activity stream. Upon detection of recoverable errors, intelligent data flow control valve 104 instructs upstream system 102 to pause sending additional events to integration layer 106.

Intelligent data flow control valve 104 continues monitoring until intelligent data flow control valve 104 detects that the recoverable errors have been fixed, at which point intelligent data flow control valve 104 instructs upstream system 102 to resume sending additional events to integration layer 106.

In accordance with an embodiment, intelligent data flow control valve 104 includes several subcomponents to enable its functionality. An activity stream puller 112 extracts event processing information from integration layer 106. A machine learning model 114 analyzes the activity stream data to identify patterns and learn from system behavior. The learning report 116 stores the results of the machine learning analysis, providing a reference for error detection and system control decisions.

In accordance with an embodiment, activity stream puller 112 of intelligent data flow control valve 104 continuously monitors integration layer 106. Activity stream puller 112 captures detailed information about event processing, including success rates, error codes, and system performance metrics. By maintaining a real-time view of integration layer activities, activity stream puller 112 enables rapid detection of emerging issues and anomalies.

In accordance with an embodiment, machine learning model 114 applies analytical techniques to the data collected by activity stream puller 112 in a learning mode. Machine learning model 114 identifies patterns in error occurrences, system behavior, and performance fluctuations. Through iterative analysis and model refinement, machine learning model 114 improves its ability to respond to recoverable errors and produce learning report 116.

In accordance with an embodiment, learning report 116 is an output generated by machine learning model 114. Learning report 116 contains detailed classifications of error types and decision rules for identifying recoverable errors. Intelligent data flow control valve 104 uses learning report 116 to determine recoverable business errors at integration layer 106. System administrators review and validate learning report 116, incorporating domain expertise to refine the automated learning process. Learning report 116 is human readable and editable using editing software.

In accordance with an embodiment, system 100 utilizes one or more databases to support its operations. The databases serve as persistent storage mechanisms for various types of data essential to the functioning of system. Database 118A stores data for upstream system 102. Database 118B stores data for intelligent data flow control valve 104.

In accordance with an embodiment, databases 118A and 118B are in-memory data structures, such as Redis (REmote DIctionary Server) databases, utilized by the system for high-performance data storage and retrieval. Redis databases provide in-memory data structures, enabling rapid access to frequently used information and supporting real-time processing requirements. In accordance with an embodiment, databases 118A and 118B implement event queue 124 and failed events queue 126, respectively.

In one or more embodiments, upstream system 102, an intelligent data flow control valve 104, an integration layer 106, downstream system 108, activity stream puller 112, a machine learning model 114, databases 118A and 118B, event API 120, event sync module 122, event queue 124, and failed events queue 126 refer to hardware and/or software configured to perform operations described herein for handling recoverable errors in an integration layer. Examples of operations for handling recoverable errors in an integration layer are described below with reference to FIG. 2.

In an embodiment, upstream system 102, an intelligent data flow control valve 104, an integration layer 106, downstream system 108, activity stream puller 112, a machine learning model 114, databases 118A and 118B, event API 120, event sync module 122, event queue 124, and failed events queue 126 are implemented and/or stored on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

3. Handling Recoverable Errors in an Integration Layer

In an embodiment, a system, such as an intelligent data flow control valve, monitors integrations between multiple software products. The system detects error scenarios that could lead to data loss such as when a downstream system is unavailable. The system analyzes activity streams from an integration layer to identify patterns of errors or failures. Upon detecting a potential data loss scenario, the system takes action to prevent further data transmission that would likely fail. The system instructs the upstream system (e.g., an event synchronization module of the upstream system) to pause sending events to the integration layer.

In an embodiment, by intelligently controlling data flow between integrated systems, the system prevents data loss during outages or failures. The system also reduces the need for custom error handling code in individual integrations and also the need for additional storage components in the integration layer 106 to store all the failed events which will have to be retried to prevent data loss. In one example, an intelligent data flow control valve operates as an independent component that monitors integration activity without requiring modifications to existing integration logic or infrastructure.

Figure 2:
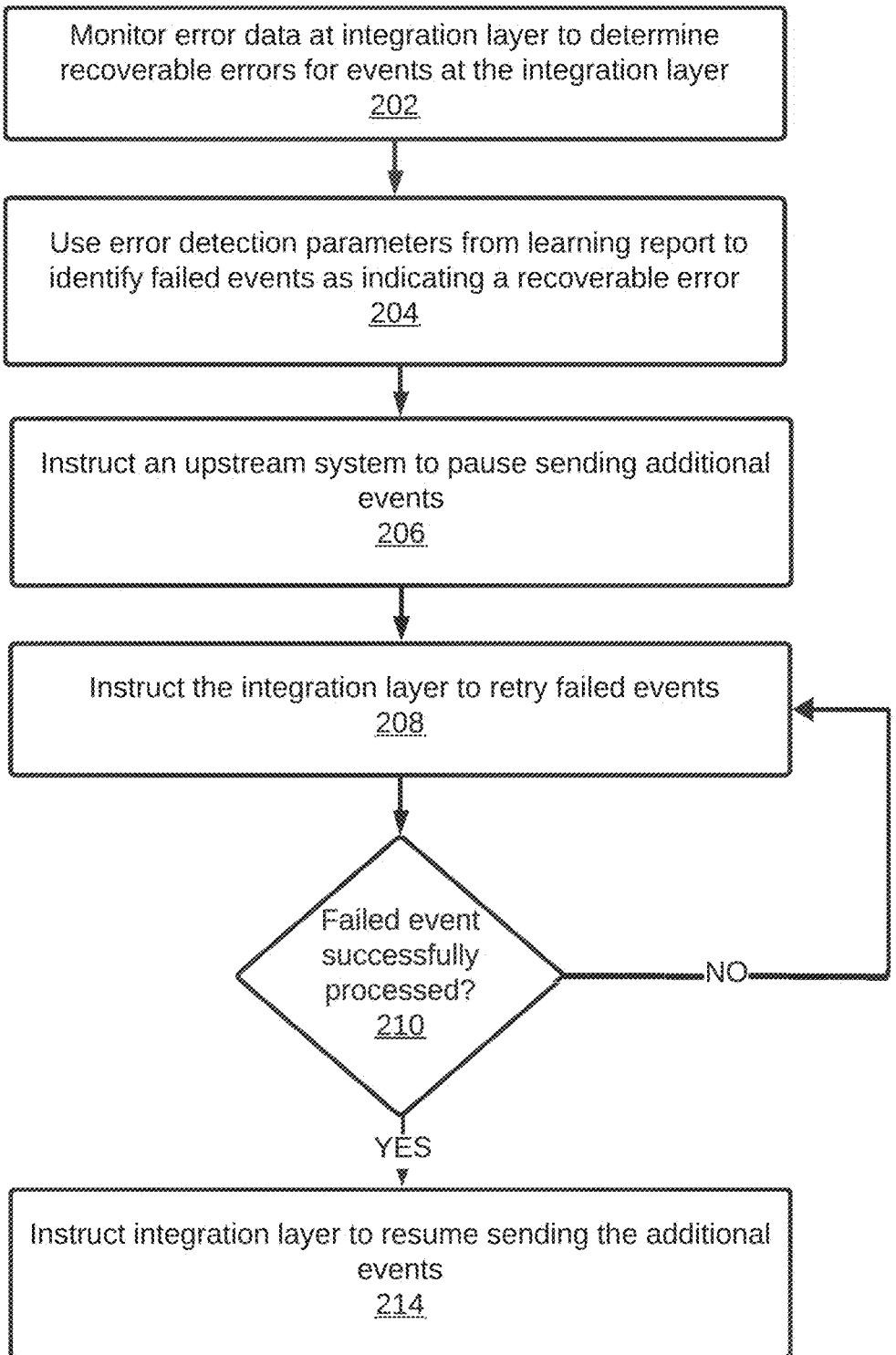
FIG. 2 illustrates an example set of operations for handling recoverable errors in an integration layer in accordance with one or more embodiments.
Figure 3:
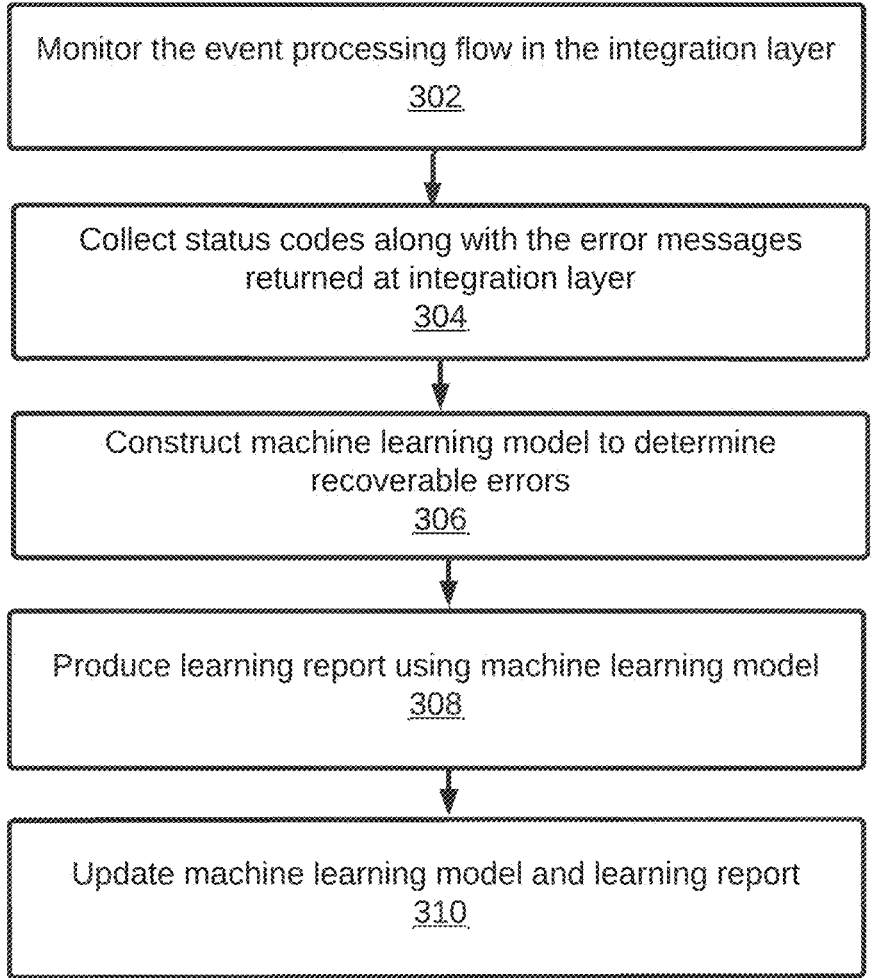
FIG. 3 illustrates an example set of operations for training a machine learning model used for handling recoverable errors in an integration layer in accordance with one or more embodiments.

In an embodiment, the system operates in two phases, a learning phase and an operational phase. In the learning phase, the system analyzes error patterns to build a learning report that detects data loss scenarios. The operational phase uses the learning report to actively monitor for and respond to potential issues. Machine learning techniques allow the system to improve its error detection capabilities over time through continued analysis of error patterns. FIG. 2 illustrates an exemplary operation phase. FIG. 3 illustrates an exemplary learning phase.

FIG. 2 illustrates an example set of operations for handling recoverable errors in an integration layer in accordance with one or more embodiments. One or more operations illustrated in FIG. 2 may be modified, rearranged, or omitted. Accordingly, the particular sequence of operations illustrated in FIG. 2 should not be construed as limiting the scope of one or more embodiments.

In an embodiment, the system monitors error data at the integration layer to determine recoverable errors for events (Operation 202). The monitoring process involves continuous analysis of event processing outcomes, error codes, and system performance metrics. By examining patterns in the error data, the system identifies scenarios that indicate recoverable errors. The system collects error data from the integration layer as part of its monitoring process, including hypertext transfer protocol (HTTP) status codes and error messages.

In an embodiment, recoverable errors are recoverable, non-business recoverable errors. Business-related errors are errors related to failures in the business logic of the integrations due to issues like data errors, business flow-related errors, unexpected inputs from upstream systems, or errors in downstream system APIs. These errors are usually handled in the integration itself. These errors are integration specific and relate to the business domain. Recoverable errors are errors that are encountered by the integration layer due to issues like outages, expired passwords, and revoked permissions.

In an embodiment, example recoverable errors include scenarios where downstream components become temporarily unreachable due to planned or unplanned downtime. During unplanned outages caused by infrastructure or software issues, the system suspends event processing and initiates recovery procedures once the downstream system restores functionality. For planned outages, such as system upgrades, the system coordinates event flow to minimize disruption and ensure seamless resumption of operations post maintenance. Example recoverable errors include situations where API calls to downstream systems fail due to expired passwords or revoked permissions.

In an embodiment, the system uses error detection parameters from a learning report to identify failed events as indicating a recoverable error (Operation 204). The learning report contains rules using parameters derived from historical data analysis and machine learning processes. In one example, rules indicate the parameter values that indicate a recoverable error. The system applies these rules to incoming error data, evaluating failed events against the established parameters to determine recoverability.

In an embodiment, the system instructs an upstream system (e.g., an event synchronization module of the upstream system) to pause sending additional events (Operation 206). Upon detecting a recoverable error scenario, the system initiates flow control measures to prevent overwhelming the integration layer with events that would likely fail processing. The instruction to pause event transmission allows the integration layer to focus on clearing existing backlogs and resolving the underlying issue without accumulating additional failed events.

Upstream systems expose APIs, allowing the intelligent control system to toggle event transmission on and off as needed. By leveraging existing buffering mechanisms in upstream systems, the system prevents overwhelming the integration layer with events that would likely fail processing.

In an embodiment, the system instructs the integration layer to retry failed events (Operation 208). Once event inflow has been temporarily halted, the system begins a systematic process of reprocessing events that previously encountered errors. The system monitors retry attempts, tracking success rates to determine when normal operations should resume. Retry requests are routed to the integration layer using stored instance identifiers associated with failed events, ensuring that reprocessing is restricted to affected events. As downstream systems recover or issues resolve, the system observes successful event processing.

In an embodiment, the system evaluates if failed events have been successfully processed (Operation 210). The system determines that a recoverable error has been fixed by detecting successful processing of previously failed events by the integration layer. Following a retry attempt, the system examines the processing outcome to determine if the error condition has been resolved. Success indicators include proper event handling and expected downstream system responses.

In an embodiment, the system instructs the integration layer to resume sending additional events (Operation 214). After confirming successful processing of previously failed events and verifying stable system operation, the system signals for normal event flow to resume. The resumption of event transmission restores full system functionality while maintaining safeguards against potential future error scenarios. By managing the entire error detection and recovery process, the system ensures no data loss occurs during temporary outages or recoverable error scenarios.

4. Training Machine Learning Model for Handling Recoverable Errors in an Integration Layer FIG. 3 illustrates an example set of operations for training a machine learning model used for handling recoverable errors in an integration layer in accordance with one or more embodiments. One or more operations illustrated in FIG. 3 may be modified, rearranged, or omitted. Accordingly, the particular sequence of operations illustrated in FIG. 3 should not be construed as limiting the scope of one or more embodiments.

In an embodiment, during the learning phase, the system analyzes patterns in error messages, HTTP status codes, and/or other metrics from the integration activity streams. The system uses this information to build a learning report that identifies problematic scenarios. An administrator reviews the learning before approving the model for use in production.

In an embodiment, machine learning capabilities allow the system to improve error detection accuracy over time. The system continuously analyzes new error patterns, refining its model to identify emerging issues. Minimal configuration requirements enable the system to automatically determine relevant learning parameters. As new integrations deploy, the system extends its monitoring and control capabilities.

In an embodiment, the system monitors the event processing flow in the integration layer (Operation 302). Continuous observation of event handling, data transformations, and system interactions provides a comprehensive view of integration layer operations. The monitoring process captures detailed metrics on processing times, success rates, and resource utilization across various stages of event handling.

In an embodiment, the system collects status codes along with the error messages returned at the integration layer (Operation 304). Aggregation of status codes and associated error messages creates a rich dataset for analysis. For example, the system may look for hypertext transfer protocol (HTTP) status codes other than 200. The system collects such status codes along with the error messages returned. In one example, the system also monitors count of similar continuous errors, time window for errors, and time needed for recovery.

In an embodiment, the system constructs a machine learning model to determine recoverable errors (Operation 306). Utilizing analytical techniques, the system processes the collected error data to identify patterns indicative of recoverable failures. The system employs algorithms to analyze various error attributes, including HTTP status codes, error message content, and error frequency patterns. By examining these factors in combination, the system determines indications of recoverable errors. The analytical process involves pattern recognition, statistical analysis of error occurrences, and correlation of error characteristics with system behavior. The machine learning model incorporates feature extraction, classification algorithms, and anomaly detection methods to distinguish between different error types to detect recoverable errors.

In an embodiment, the system produces a learning report using the machine learning model (Operation 308). A machine learning model within the system generates a learning report comprising error detection parameters for identifying recoverable errors. For example, these parameters may include HTTP status codes, error message patterns, counts of similar continuous errors, time windows for errors, and/or time needed for recovery. The system uses these parameters from the learning report to detect recoverable errors. The learning report remains user reviewable, allowing for manual adjustments to error detection parameters based on user input. In the manual review phase, users remove error codes that are not of interest or correct the labels/error message patterns as necessary. For example, users make one or more user adjustments to one or more error detection parameters in the learning report. The system is given the reviewed learning report that the system uses for error detection and corrective actions in the operational phase. The system uses the learning report to recognize various error patterns based on one or more of the parameters.

In an embodiment, the system updates the machine learning model and learning report (Operation 310). Continuous refinement of the model ensures adaptation to evolving system behavior and emerging error patterns. The update process incorporates new data, retrains model components, and adjusts classification thresholds to maintain accuracy in error detection and recovery strategies.

5.Example Embodiment

FIGS. 4A-4E illustrate an example of the use of an intelligent data flow control valve in accordance with one or more embodiments. The operation of figures FIGS. 4A-4E is merely illustrative. Other alternative operations may be used.

Figure 4A:
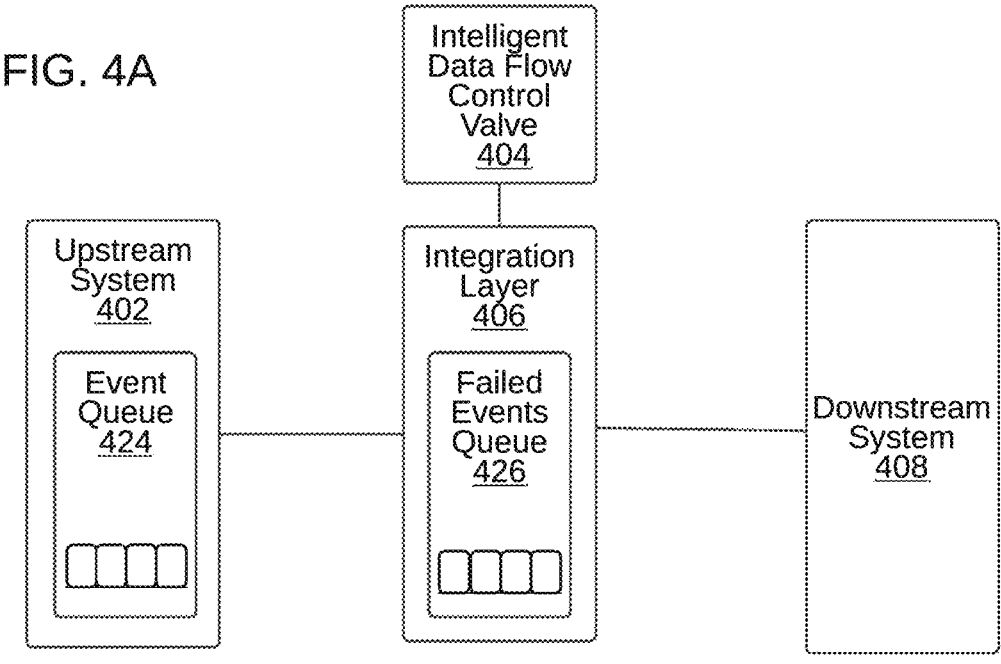
FIGS. 4A-4E illustrate an example of the use of an intelligent data flow control valve in accordance with one or more embodiments.

In accordance with an embodiment, FIG. 4A illustrates the initial state of the system, corresponding to the monitoring phase described in Operation 202 of FIG. 2. Upstream system 402 generates events and transmits them through the event queue 424 to the integration layer 406. Intelligent data flow control valve 404 observes the flow of events and analyzes processing outcomes. Downstream system 408 receives processed data from integration layer 406, completing the normal event processing cycle. In FIG. 4A, event queue 424 and failed events queue 426 are shown as being empty.

Figure 4B:
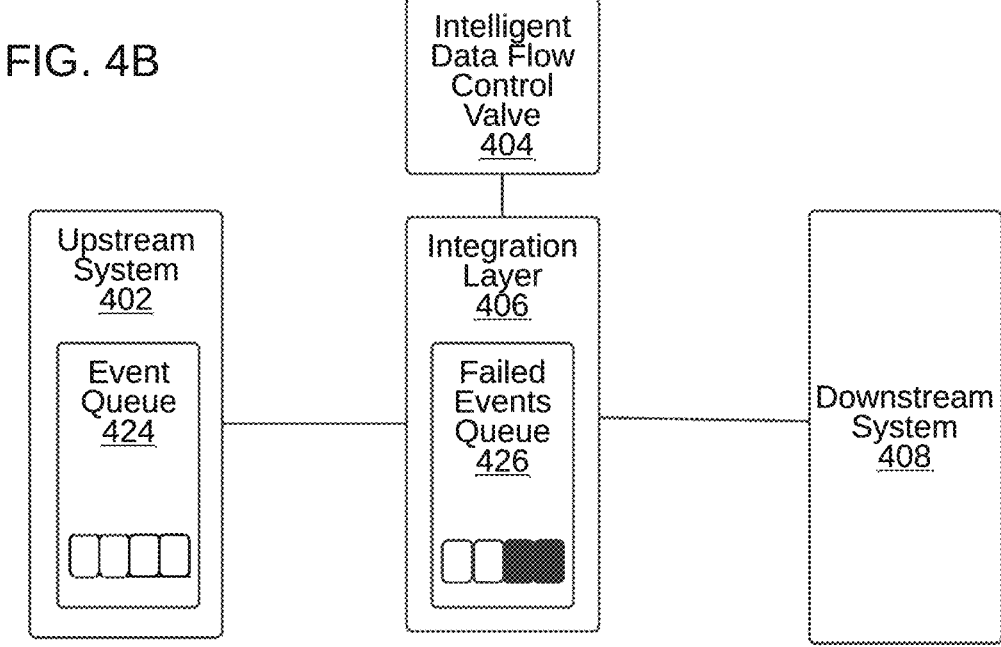

In accordance with an embodiment, FIG. 4B depicts the system state after the detection of recoverable errors as outlined in Operation 204 of FIG. 2. Failed events queue 426 within integration layer 406 begins to accumulate events that encountered processing issues.

Intelligent data flow control valve 404 identifies these failures as recoverable based on learned patterns and error detection parameters. The accumulation of failed events triggers the system to initiate corrective actions. In FIG. 4B, event queue 424 is empty, whereas failed events queue 426 includes some failed events.

Figure 4C:
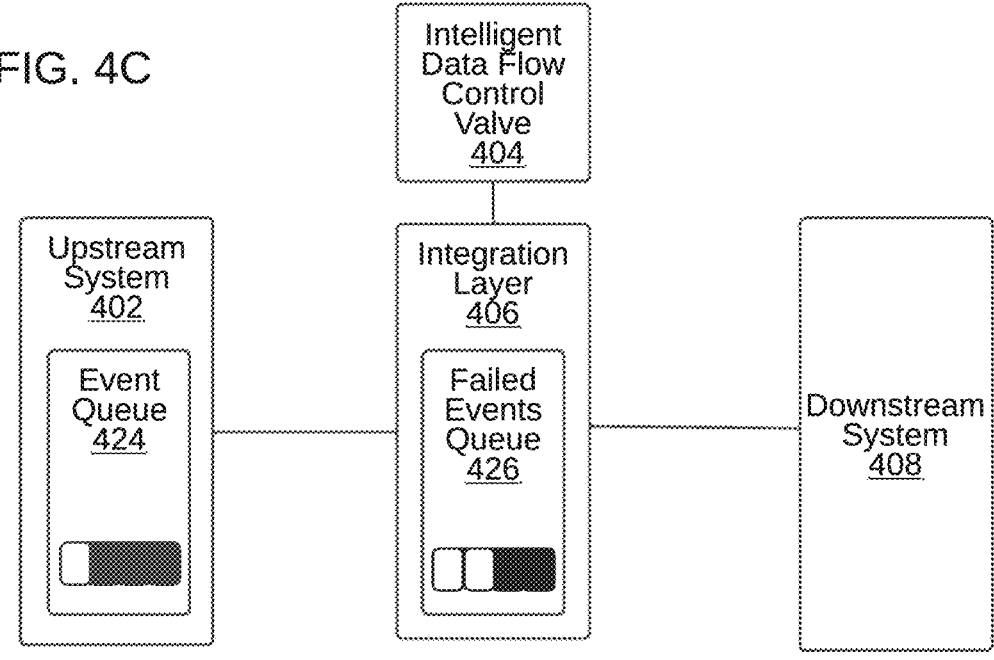

In accordance with an embodiment, FIG. 4C illustrates the system's response to detected errors, aligning with Operation 206 of FIG. 2. Intelligent data flow control valve 404 instructs upstream system 402 (e.g., an event synchronization module of the upstream system 402) to pause sending additional events. As a result, new events generated by upstream system 402 accumulate in event queue 424. This pause in event transmission prevents overwhelming integration layer 406 with events that would likely fail processing due to the ongoing issue. In FIG. 4C, event queue 424 includes some paused events, and failed events queue 426 includes some failed events.

Figure 4D:
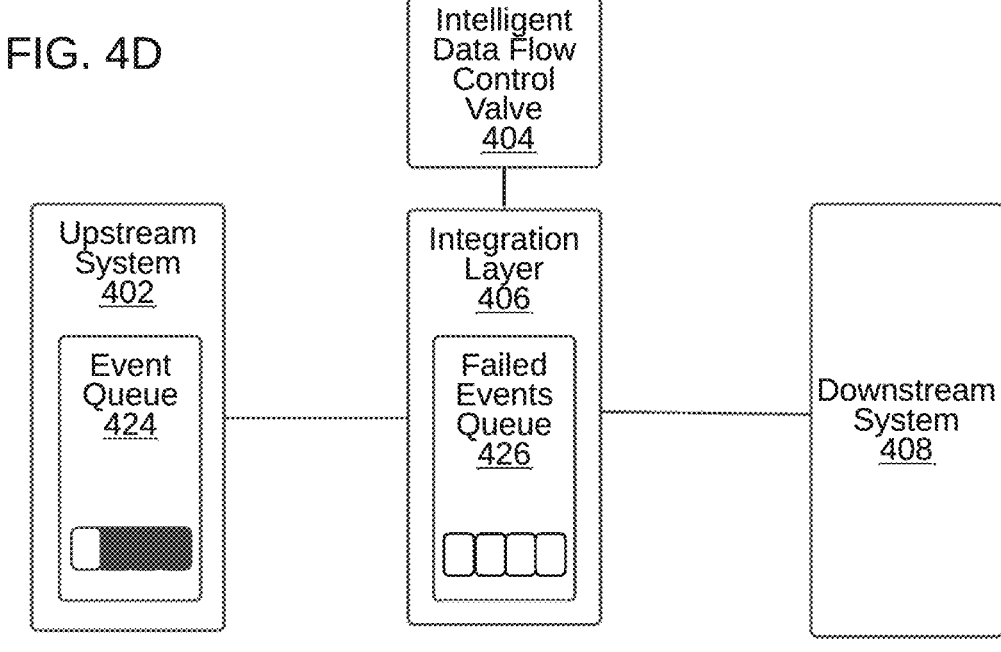

In accordance with an embodiment, FIG. 4D shows the system state during the retry phase, corresponding to Operations 208 and 210 of FIG. 2. Intelligent data flow control valve 404 orchestrates the reprocessing of events from failed events queue 426. As retry attempts succeed, events are cleared from failed events queue 426 and successfully processed through integration layer 406 to downstream system 408. Upstream system 402 continues to buffer new events in its queue while the retry process is underway. In FIG. 4D, event queue 424 includes some paused events, and failed events queue 426 is cleared of failed events.

Figure 4E:
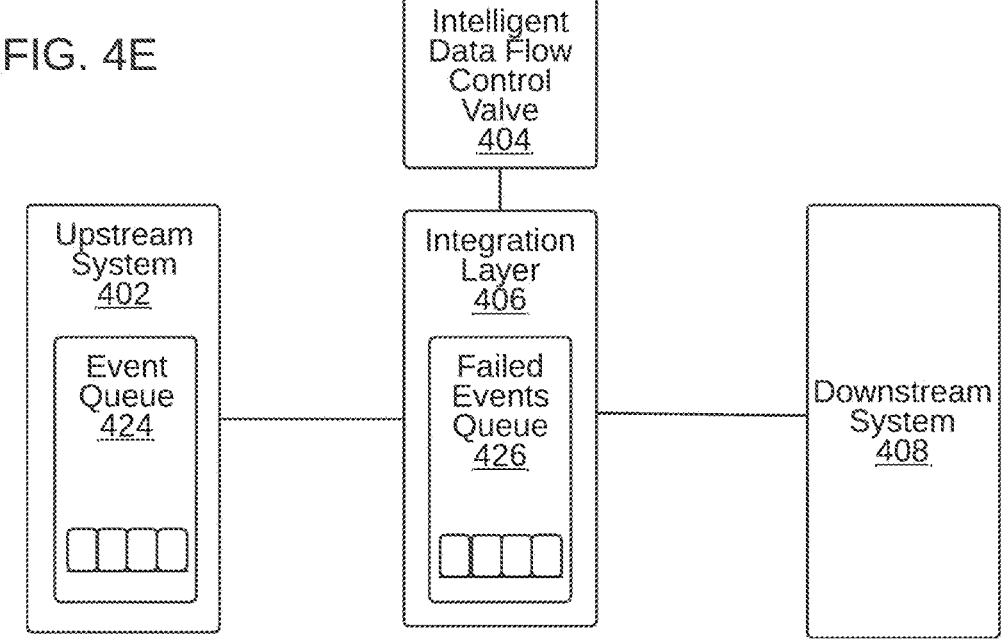

In accordance with an embodiment, FIG. 4E depicts the system returning to normal operation as described in Operation 214 of FIG. 2. Intelligent data flow control valve 404, having confirmed successful processing of previously failed events, instructs upstream system 402 (e.g., an event synchronization module of upstream system 402) to resume normal event transmission. The accumulated events in the upstream system]s queue begin flowing to integration layer 406 for processing. Failed events queue 426 remains empty, indicating resolution of the previous error condition. The system has successfully recovered from the temporary disruption and restored full operational capacity. In FIG. 4E, event queue 424 does not contain paused events, and failed events queue 426 is cleared of failed events.

6. Practical Applications, Advantages, & Improvements

The intelligent data flow control valve system provides significant technical improvements in computer network operations, particularly in the realm of event-driven integrations. By implementing intelligent monitoring and control mechanisms, the system enhances the reliability and efficiency of data transmission across complex, distributed architectures. The system's ability to detect recoverable errors in real-time and dynamically adjust event flow prevents cascading failures and data loss, thereby improving overall system stability. Through automated pause and resume functionality, the system optimizes resource utilization during error recovery processes, reducing unnecessary network traffic and computational overhead. For example, because the upstream system stores paused events in its own event queue, the integration layer does not need to store those events, freeing computing resources at the integration layer for other purposes such as storing and processing failed events. Thus, one or more embodiments allow the integration layer to operate more efficiently, with fewer computing resources.

In addition, in an embodiment, the integration of machine learning techniques for error detection and classification enables the system to adapt to evolving network conditions and error patterns, continuously improving its ability to maintain data integrity and system performance. By centralizing error handling logic, the system simplifies integration development and maintenance, allowing organizations to focus on core business logic rather than infrastructure reliability concerns. The system's approach to managing recoverable errors represents an advancement in fault-tolerant distributed systems, enabling more robust and resilient enterprise integrations.

7. Miscellaneous; Extensions

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
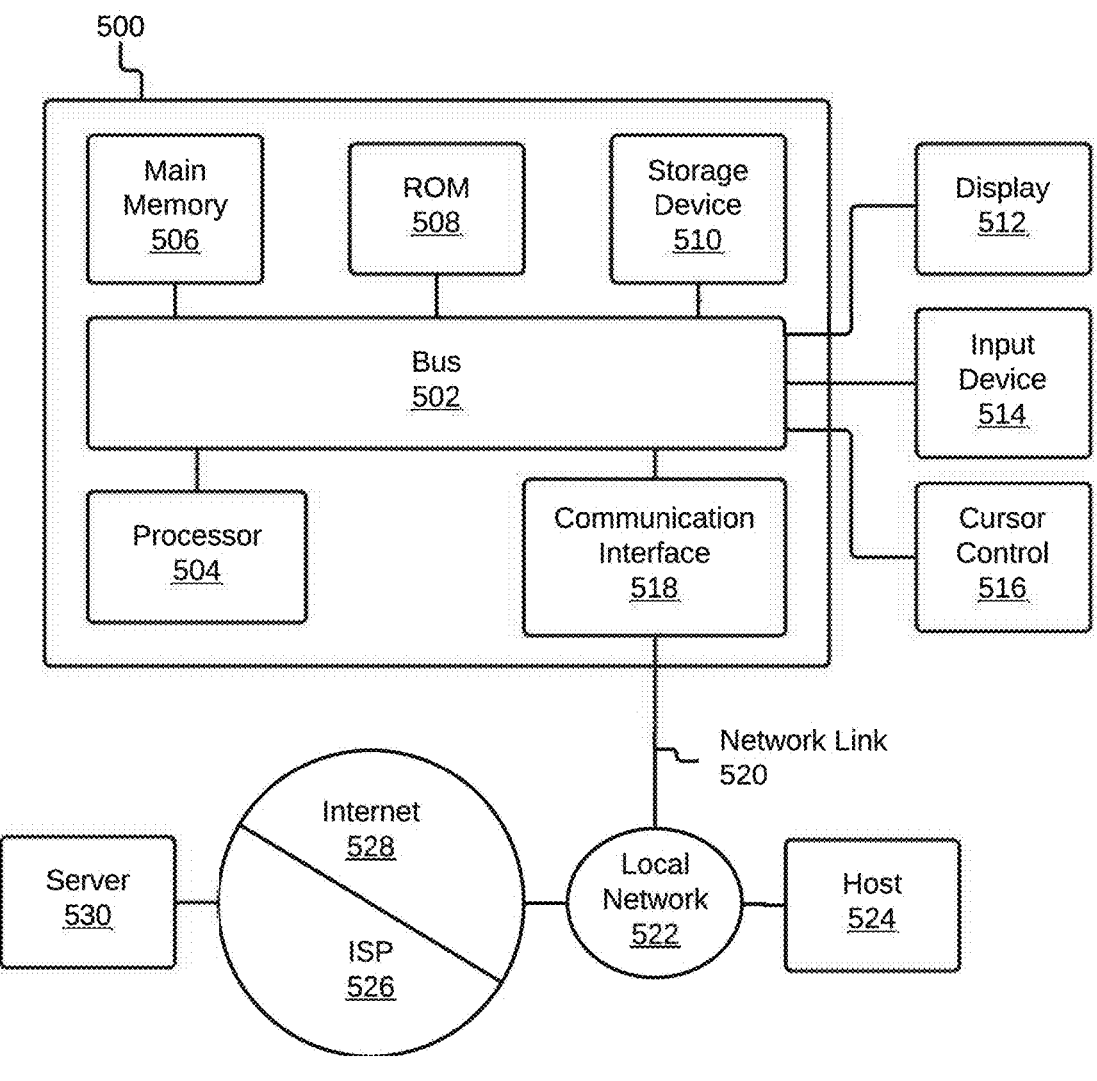
FIG. 5 shows a block diagram that illustrates a system in accordance with one or more embodiments.

For example, FIG. 5 is a block diagram that illustrates a computer system 500 upon which an embodiment of the disclosure may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

What is claimed is:

1. One or more non-transitory computer-readable media comprising instructions which, when executed by one or more hardware processors, cause performance of operations comprising:

monitoring an activity stream of an integration layer that is configured to (a) receive events from an upstream system, via an event queue of the upstream system that buffers the events before transmission to the integration layer, and (b) transmit data to a downstream system responsive to the events;

detecting, while monitoring the activity stream, a recoverable error between the integration layer and the downstream system;

responsive to detecting the recoverable error: instructing the upstream system to pause sending additional events to the integration layer, causing the upstream system to retain a paused event in the event queue of the upstream system;

storing, in a failed events queue of the integration layer, a failed event attributable to the recoverable error;

after instructing the upstream system to pause sending additional events to the integration layer:

attempting reprocessing of the failed event from the failed events queue of the integration layer;

detecting that reprocessing of the failed event was successful;

based at least in part on detecting that reprocessing of the failed event was successful, detecting that the recoverable error is fixed; and responsive to detecting that the recoverable error is fixed: instructing the upstream system to resume sending additional events to the integration layer, causing the upstream system to release the paused event from the event queue of the upstream system to the integration layer.

2. The one or more non-transitory computer-readable media of claim 1, wherein detecting that the recoverable error is fixed comprises:

detecting that the integration layer has successfully processed one or more failed events received before the upstream system paused sending events to the integration layer.

3. The one or more non-transitory computer-readable media of claim 1, wherein monitoring the activity stream of the integration layer comprises collecting error data from the integration layer, wherein the error data comprises hypertext transfer protocol (HTTP) status codes and error messages.

4. The one or more non-transitory computer-readable media of claim 1, wherein the operations further comprise:

using a machine learning model to generate a learning report comprising one or more error detection parameters for detecting recoverable errors;

wherein the one or more error detection parameters comprise one or more of a hypertext transfer protocol (HTTP) status code, an error message pattern, a count of similar continuous errors, a time window for errors, or a time needed for recovery; and wherein detecting the recoverable error is based at least in part on the one or more error detection parameters in the learning report.

5. The one or more non-transitory computer-readable media of claim 4, wherein the learning report is user-reviewable, and wherein the operations further comprise receiving user input comprising one or more user adjustments to one or more error detection parameters in the learning report.

6. The one or more non-transitory computer-readable media of claim 4, wherein the operations further comprise: training the machine learning model to identify recoverable errors.

7. The one or more non-transitory computer-readable media of claim 1, wherein the recoverable error comprises at least one of: a planned outage, an unplanned outage, a password expiration, or a permission issue.

8. The one or more non-transitory computer-readable media of claim 1, wherein the operations further comprise routing retry requests to the integration layer based on stored instance identifiers associated with one or more failed events.

9. A method comprising:
monitoring an activity stream of an integration layer that is configured to (a) receive events from an upstream system, via an event queue of the upstream system that buffers the events before transmission to the integration layer, and (b) transmit data to a downstream system responsive to the events;
detecting, while monitoring the activity stream, a recoverable error between the integration layer and the downstream system;
responsive to detecting the recoverable error: instructing the upstream system to pause sending additional events to the integration layer, causing the upstream system to retain a paused event in the event queue of the upstream system;
storing, in a failed events queue of the integration layer, a failed event attributable to the recoverable error;
after instructing the upstream system to pause sending additional events to the integration layer:
attempting reprocessing of the failed event from the failed events queue of the integration layer;
detecting that reprocessing of the failed event was successful;
based at least in part on detecting that reprocessing of the failed event was successful, detecting that the recoverable error is fixed; and
responsive to detecting that the recoverable error is fixed:
instructing the upstream system to resume sending additional events to the integration layer, causing the upstream system to release the paused event from the event queue of the upstream system to the integration layer;
wherein the method is performed by at least one device including a hardware processor.

10. The method of claim 9, wherein detecting that the recoverable error is fixed comprises:
detecting that the integration layer has successfully processed one or more failed events received before the upstream system paused sending events to the integration layer.

11. The method of claim 9, wherein monitoring the activity stream of the integration layer comprises collecting error data from the integration layer, wherein the error data comprises hypertext transfer protocol (HTTP) status codes and error messages.

12. The method of claim 9, further comprising:
using a machine learning model to generate a learning report comprising one or more error detection parameters for detecting recoverable errors;
wherein the one or more error detection parameters comprise one or more of a hypertext transfer protocol (HTTP) status code, an error message pattern, a count of similar continuous errors, a time window for errors, or a time needed for recovery; and
wherein detecting the recoverable error is based at least in part on the one or more error detection parameters in the learning report.

13. The method of claim 12, wherein the learning report is user-reviewable, further comprising receiving user input comprising one or more user adjustments to one or more error detection parameters in the learning report.

14. The method of claim 12, further comprising:
training the machine learning model to identify recoverable errors.

15. The method of claim 9, wherein the recoverable error comprises at least one of: a planned outage, an unplanned outage, a password expiration, or a permission issue.

16. The method of claim 9, further comprising routing retry requests to the integration layer based on stored instance identifiers associated with one or more failed events.

17. A system comprising:
at least one device including a hardware processor;
the system being configured to perform operations comprising:
monitoring an activity stream of an integration layer that is configured to (a) receive events from an upstream system, via an event queue of the upstream system that buffers the events before transmission to the integration layer, and (b) transmit data to a downstream system responsive to the events;
detecting, while monitoring the activity stream, a recoverable error between the integration layer and the downstream system;
responsive to detecting the recoverable error: instructing the upstream system to pause sending additional events to the integration layer, causing the upstream system to retain a paused event in the event queue of the upstream system;
storing, in a failed events queue of the integration layer, a failed event attributable to the recoverable error;
after instructing the upstream system to pause sending additional events to the integration layer:
attempting reprocessing of the failed event from the failed events queue of the integration layer;
detecting that reprocessing of the failed event was successful;
based at least in part on detecting that reprocessing of the failed event was successful, detecting that the recoverable error is fixed; and
responsive to detecting that the recoverable error is fixed: instructing the upstream system to resume sending additional events to the integration layer, causing the upstream system to release the paused event from the event queue of the upstream system to the integration layer.

18. The system of claim 17, wherein detecting that the recoverable error is fixed comprises:
detecting that the integration layer has successfully processed one or more failed events received before the upstream system paused sending events to the integration layer.

19. The system of claim 18, wherein monitoring the activity stream of the integration layer comprises collecting error data from the integration layer, wherein the error data comprises hypertext transfer protocol (HTTP) status codes and error messages.

20. The one or more non-transitory computer-readable media of claim 1, wherein detecting the recoverable error comprises detecting the failed event.

* * * * *